United States Patent
Govindasamy et al.

(10) Patent No.: US 10,235,098 B1
(45) Date of Patent: Mar. 19, 2019

(54) WRITABLE CLONES WITH MINIMAL OVERHEAD

(71) Applicant: Pavilion Data Systems, Inc., San Jose, CA (US)

(72) Inventors: Raghuraman Govindasamy, San Jose, CA (US); Venkeepuram R. Satish, Fremont, CA (US); Muthukumar Ratty, Santa Clara, CA (US)

(73) Assignee: Pavilion Data Systems, Inc., San Jose, CA (US)

(*) Notice: Subject to any disclaimer, the term of this patent is extended or adjusted under 35 U.S.C. 154(b) by 121 days.

(21) Appl. No.: 15/402,953

(22) Filed: Jan. 10, 2017

(51) Int. Cl.
  *G06F 12/00* (2006.01)
  *G06F 3/06* (2006.01)

(52) U.S. Cl.
  CPC .......... *G06F 3/0659* (2013.01); *G06F 3/0604* (2013.01); *G06F 3/067* (2013.01)

(58) Field of Classification Search
  CPC ....... G06F 3/0659; G06F 3/0604; G06F 3/067
  See application file for complete search history.

(56) References Cited

U.S. PATENT DOCUMENTS

| | | | |
|---|---|---|---|
| 9,940,377 B1* | 4/2018 | Sait | G06F 17/3007 |
| 2014/0164687 A1* | 6/2014 | Kwon | G06F 12/0246 |
| | | | 711/103 |
| 2014/0189232 A1* | 7/2014 | Enohara | G06F 3/0611 |
| | | | 711/111 |
| 2015/0113239 A1* | 4/2015 | Katori | G06F 3/0619 |
| | | | 711/162 |

* cited by examiner

*Primary Examiner* — Gurtej Bansal
(74) *Attorney, Agent, or Firm* — Lowenstein Sandler LLP

(57) ABSTRACT

A processing device generates a clone of a first volume of storage, the first volume comprising a plurality of storage blocks, wherein the clone is a second volume that is writable and that references the plurality of storage blocks. The processing device increments a global volume count that represents a number of volumes. For each storage block of the plurality of storage blocks, the processing device postpones an update to metadata of the storage block until an event that causes any volume to stop referencing the storage block, wherein the metadata indicates volumes that reference the storage block.

19 Claims, 11 Drawing Sheets

Time = T1
- 1st Global Volume Bitmap 405: | 1 | 1 | 0 | 0 | 0 | 0 | 0 | 0 |
- B6 Bitmap 410: | 1 | 1 | 0 | 0 | 0 | 0 | 0 | 0 |
- B45 Bitmap 415: | 1 | 1 | 0 | 0 | 0 | 0 | 0 | 0 |
- B102 Bitmap 420: | 1 | 1 | 0 | 0 | 0 | 0 | 0 | 0 |

Time = T2
- 1st Global Volume Bitmap 405: | 1 | 1 | 1 | 0 | 0 | 0 | 0 | 0 |
- B6 Bitmap 410: | 1 | 1 | 0 | 0 | 0 | 0 | 0 | 0 |
- B45 Bitmap 415: | 1 | 1 | 0 | 0 | 0 | 0 | 0 | 0 |
- B102 Bitmap 420: | 1 | 1 | 0 | 0 | 0 | 0 | 0 | 0 |

Time = T3
- 1st Global Volume Bitmap 405: | 1 | 1 | 1 | 1 | 0 | 0 | 0 | 0 |
- B6 Bitmap 410: | 1 | 1 | 0 | 0 | 0 | 0 | 0 | 0 |
- B45 Bitmap 415: | 1 | 1 | 0 | 0 | 0 | 0 | 0 | 0 |
- B102 Bitmap 420: | 1 | 1 | 0 | 0 | 0 | 0 | 0 | 0 |

Time = T4
- 1st Global Volume Bitmap 405: | 1 | 1 | 1 | 1 | 0 | 0 | 0 | 0 |
- B6 Bitmap 410: | 1 | 1 | 0 | 0 | 0 | 0 | 0 | 0 |
- B45 Bitmap 415: | 1 | 1 | 0 | 0 | 0 | 0 | 0 | 0 |
- B102 Bitmap 420: | 1 | 1 | 0 | 0 | 0 | 0 | 0 | 0 |
- B12 Bitmap 425: | 0 | 0 | 1 | 1 | 0 | 0 | 0 | 0 |

FIG. 4A

Time = T5
- 1st Global Volume Bitmap 405: | 1 | 0 | 1 | 1 | 0 | 0 | 0 | 0 |
- 2nd Global Volume Bitmap 430: | 1 | 1 | 1 | 0 | 0 | 0 | 0 | 0 |
- B6 Bitmap 410: | 1 | 1 | 1 | 0 | 0 | 0 | 0 | 0 |
- B45 Bitmap 415: | 1 | 1 | 1 | 0 | 0 | 0 | 0 | 0 |
- B102 Bitmap 420: | 1 | 1 | 1 | 0 | 0 | 0 | 0 | 0 |
- B12 Bitmap 425: | 0 | 0 | 1 | 1 | 0 | 0 | 0 | 0 |

Time = T6
- 1st Global Volume Bitmap 405: | 1 | 0 | 1 | 1 | 0 | 0 | 0 | 0 |
- 2nd Global Volume Bitmap 430: | 1 | 1 | 1 | 0 | 0 | 0 | 0 | 0 |
- B6 Bitmap 410: | 1 | 1 | 1 | 0 | 0 | 0 | 0 | 0 |
- B45 Bitmap 415: | 1 | 1 | 1 | 0 | 0 | 0 | 0 | 0 |
- B102 Bitmap 420: | 1 | 1 | 1 | 0 | 0 | 0 | 0 | 0 |
- B12 Bitmap 425: | 0 | 0 | 1 | 0 | 0 | 0 | 0 | 0 |

Time = T7
- 2nd Global Volume Bitmap 430: | 1 | 0 | 1 | 1 | 0 | 0 | 0 | 0 |
- B6 Bitmap 410: | 1 | 1 | 1 | 0 | 0 | 0 | 0 | 0 |
- B45 Bitmap 415: | 1 | 1 | 1 | 0 | 0 | 0 | 0 | 0 |
- B102 Bitmap 420: | 1 | 1 | 1 | 0 | 0 | 0 | 0 | 0 |

Time = T8
- 2nd Global Volume Bitmap 430: | 1 | 1 | 0 | 1 | 0 | 0 | 0 | 0 |
- 3rd Global Volume Bitmap 432: | 1 | 1 | 1 | 0 | 0 | 0 | 0 | 0 |
- B6 Bitmap 410: | 1 | 1 | 1 | 0 | 0 | 0 | 0 | 0 |
- B45 Bitmap 415: | 1 | 1 | 1 | 0 | 0 | 0 | 0 | 0 |
- B102 Bitmap 420: | 1 | 1 | 1 | 0 | 0 | 0 | 0 | 0 |

FIG. 4B

Time = T9
- 3rd Global Volume Bitmap 432: | 1 | 1 | 1 | 0 | 0 | 0 | 0 | 0 |
- B6 Bitmap 410: | 1 | 1 | 1 | 0 | 0 | 0 | 0 | 0 |
- B45 Bitmap 415: | 1 | 1 | 1 | 0 | 0 | 0 | 0 | 0 |
- B102 Bitmap 420: | 1 | 1 | 1 | 0 | 0 | 0 | 0 | 0 |
- B40 Bitmap 435: | 0 | 1 | 1 | 0 | 0 | 0 | 0 | 0 |

Time = T10
- 3rd Global Volume Bitmap 432: | 1 | 1 | 1 | 0 | 0 | 0 | 0 | 0 |
- B6 Bitmap 410: | 1 | 1 | 1 | 0 | 0 | 0 | 0 | 0 |
- B45 Bitmap 415: | 1 | 0 | 1 | 0 | 0 | 0 | 0 | 0 |
- B102 Bitmap 420: | 1 | 1 | 1 | 0 | 0 | 0 | 0 | 0 |
- B40 Bitmap 435: | 0 | 1 | 1 | 0 | 0 | 0 | 0 | 0 |

Time = T11
- 3rd Global Volume Bitmap 432: | 1 | 1 | 1 | 0 | 0 | 0 | 0 | 0 |
- B6 Bitmap 410: | 0 | 1 | 1 | 0 | 0 | 0 | 0 | 0 |
- B45 Bitmap 415: | 1 | 0 | 1 | 0 | 0 | 0 | 0 | 0 |
- B102 Bitmap 420: | 1 | 1 | 1 | 0 | 0 | 0 | 0 | 0 |
- B40 Bitmap 435: | 0 | 1 | 1 | 0 | 0 | 0 | 0 | 0 |

Time = T12
- 3rd Global Volume Bitmap 432: | 1 | 1 | 1 | 1 | 0 | 0 | 0 | 0 |
- B6 Bitmap 410: | 0 | 1 | 1 | 0 | 0 | 0 | 0 | 0 |
- B45 Bitmap 415: | 1 | 0 | 1 | 0 | 0 | 0 | 0 | 0 |
- B102 Bitmap 420: | 1 | 1 | 1 | 0 | 0 | 0 | 0 | 0 |
- B40 Bitmap 435: | 0 | 1 | 1 | 0 | 0 | 0 | 0 | 0 |

FIG. 4C

Time = T13
- 3rd Global Volume Bitmap 432: | 1 | 1 | 1 | 1 | 0 | 0 | 0 | 0 |
- B6 Bitmap 410: | 0 | 0 | 0 | 1 | 0 | 0 | 0 | 0 |
- B45 Bitmap 415: | 1 | 0 | 1 | 0 | 0 | 0 | 0 | 0 |
- B102 Bitmap 420: | 1 | 1 | 0 | 0 | 0 | 0 | 0 | 0 |
- B40 Bitmap 435: | 0 | 1 | 1 | 0 | 0 | 0 | 0 | 0 |

Time = T14
- 3rd Global Volume Bitmap 432: | 0 | 1 | 1 | 1 | 0 | 0 | 0 | 0 |
- 4th Global Volume Bitmap 440: | 1 | 1 | 1 | 0 | 0 | 0 | 0 | 0 |
- B45 Bitmap 415: | 0 | 1 | 1 | 0 | 0 | 0 | 0 | 0 |
- B102 Bitmap 420: | 1 | 1 | 1 | 0 | 0 | 0 | 0 | 0 |
- B40 Bitmap 435: | 1 | 1 | 1 | 0 | 0 | 0 | 0 | 0 |

Time = T15
- 4th Global Volume Bitmap 440: | 0 | 1 | 1 | 0 | 0 | 0 | 0 | 0 |
- 5th Global Volume Bitmap 445: | 1 | 1 | 0 | 0 | 0 | 0 | 0 | 0 |
- B45 Bitmap 415: | 1 | 1 | 0 | 0 | 0 | 0 | 0 | 0 |
- B102 Bitmap 420: | 1 | 1 | 0 | 0 | 0 | 0 | 0 | 0 |
- B40 Bitmap 435: | 1 | 1 | 0 | 0 | 0 | 0 | 0 | 0 |

Time = T16
- 5th Global Volume Bitmap 445: | 0 | 1 | 0 | 0 | 0 | 0 | 0 | 0 |
- 6th Global Volume Bitmap 450: | 1 | 0 | 0 | 0 | 0 | 0 | 0 | 0 |
- B45 Bitmap 415: | 1 | 0 | 0 | 0 | 0 | 0 | 0 | 0 |
- B102 Bitmap 420: | 1 | 0 | 0 | 0 | 0 | 0 | 0 | 0 |
- B40 Bitmap 435: | 1 | 0 | 0 | 0 | 0 | 0 | 0 | 0 |

FIG. 4D ered to herein as clones) with minimal overhead. Storage volumes (also referred to herein simply as volumes) use either an underlying block device that includes multiple storage blocks or an underlying file system. A clone of a storage volume is a new storage volume that contains references to each of the storage blocks or files referenced by the cloned storage volume. The clone does not include actual copies of the storage blocks or files in the cloned storage volume. Notably, storage volumes that are clones are writable. Accordingly, reads and writes are permitted both to the original storage volume and to generated clones.

WRITABLE CLONES WITH MINIMAL OVERHEAD

FIELD OF TECHNOLOGY

This disclosure relates generally to the field of data storage and in particular to managing writable clones of storage volumes with minimal overhead.

BACKGROUND

Many enterprise storage solutions on the market enable the generation of read-only copies of storage volumes called storage snapshots. A storage snapshot is the state of a storage volume at a particular point in time. Rather than containing a separate copy of each block of the storage volume, the snapshot contains references to the storage blocks of the storage volume.

Some enterprise storage solutions also provide functionality for the generation of writable copies of storage volumes that are similar to snapshots. However, for such storage solutions the generation of the writable copy requires modification to metadata of each of the storage blocks of the storage volume that is being copied when the writable copy is generated. While modifying the metadata of the storage blocks is quicker than generating copies of those storage blocks, the amount of time required to update the metadata can be non-trivial, and is dependent on the size of the storage volume. In particular, generating a clone is generally an order of n operation (where n is equal to the number of storage blocks used by a cloned volume).

BRIEF DESCRIPTION OF THE DRAWINGS

The embodiments described herein will be understood more fully from the detailed description given below and from the accompanying drawings.

FIGS. 4A-D illustrate the states of bitmaps used to manage the storage volume of FIG. 3 at various points of time on the timeline.

DETAILED DESCRIPTION

Figure 1:
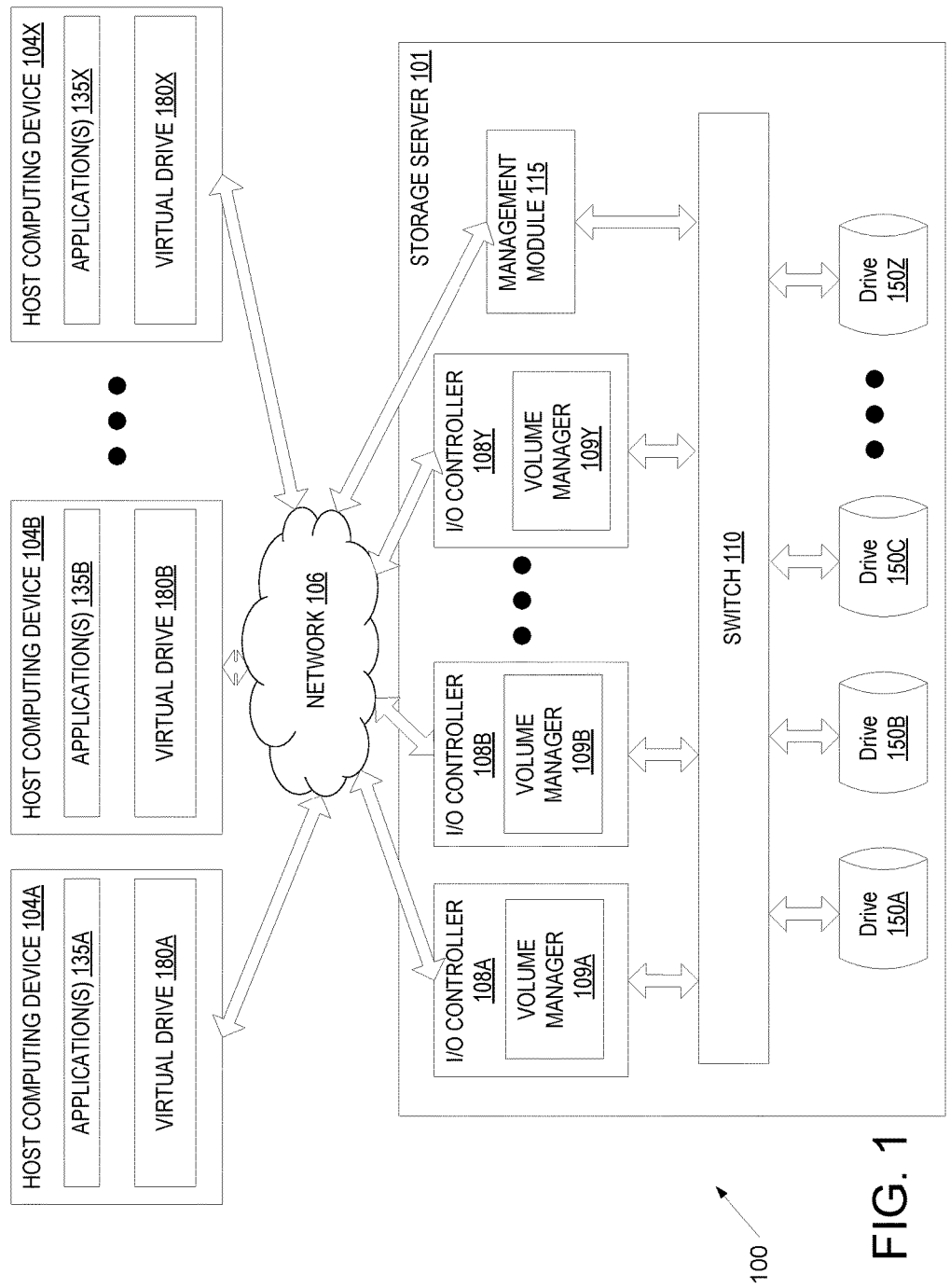
FIG. 1 is a block diagram example of a network architecture, in which embodiments described herein may operate.

Described herein are systems and methods that provide a capability to create writable copies of storage volumes (referred to herein as clones) with minimal overhead. Storage volumes (also referred to herein simply as volumes) use either an underlying block device that includes multiple storage blocks or an underlying file system. A clone of a storage volume is a new storage volume that contains references to each of the storage blocks or files referenced by the cloned storage volume. The clone does not include actual copies of the storage blocks or files in the cloned storage volume. Notably, storage volumes that are clones are writable. Accordingly, reads and writes are permitted both to the original storage volume and to generated clones.

Traditionally, when a writable copy of a storage volume is generated, the metadata for each of the files or storage blocks in the underlying file system or block device is immediately updated. Previous solutions are not capable of postponing the metadata updates for the storage blocks because in such solutions the postponement would cause storage blocks to be deleted while storage volumes are still using those storage blocks. In contrast, implementations of the present invention provide a mechanism that generates clones (writable copies) of storage volumes without immediately updating the metadata for the underlying storage blocks or files. In particular, when a writable copy is generated, updates to the metadata of the underlying storage blocks or files used by the copied storage volume are postponed until those storage blocks or files are to be modified or deleted for any storage volume that references those storage blocks. These updates are additional read and/or write operations to storage devices that in previous solutions incur overhead associated with the generation of the writable copy. Accordingly, in embodiments the generation of a clone is an order 1 operation, and no searches may be performed in order to update the metadata of storage blocks.

In one embodiment, a global volume count is incremented at the time that a clone is generated for a storage volume. Incrementing the global volume count may not introduce any additional read or write operations to storage devices. When the storage volume, the clone of the storage volume, or another clone of the storage volume receives a command that would cause a particular storage block to be deleted or modified, the postponed alteration of the metadata for that storage block is performed prior to the deletion or modification of that storage block. As a result, no additional read or write operations are performed to update the metadata of the storage block because the operation to update the metadata can be performed as part of the operation to delete or modify the storage block. This significantly reduces the overhead associated with generating clones of storage volumes.

Embodiments are discussed herein with reference to block devices and storage blocks. However, it should be understood that the principles and functionality described herein work equally well for file system implementations. Accordingly, any references to block devices should be understood as also applying to file systems. Additionally, any references to storage blocks in a block device should be understood as also applying to files in a file system.

FIG. 1 is a block diagram example of a network architecture 100, in which embodiments described herein may operate. The network architecture 100 may include one or more host computing devices (e.g., host computing devices 104A, 104B through 104X) connected to a storage server 101 via a network 106. Network 106 may be a wide area network (WAN) such as the Internet, a local area network (LAN), a storage area network (SAN) or a combination thereof. The host computing devices 104A-X and/or storage server 101 may connect to the network 106 via an Ethernet, Fibre Channel (FC), Fibre channel over Ethernet (FCoE), Infiniband®, serial attached small computer system interface (SAS) or serial ATA (SATA) protocol. Alternatively, other protocols may be used to connect to the network 106.

Storage server 101 is a computing device that is configured and optimized to provide storage to remote computing devices (e.g., to host computing devices 104A-X, also referred to herein as client computing devices). Storage server 101 may be configured as a storage area network (SAN), network attached storage (NAS), or other remote storage type. Though a single storage server 101 is shown, the host computing devices 104A-X may connect to multiple storage servers. The multiple storage servers may be arranged in a cluster or other configuration.

Host computing devices 104A-X may each include a physical machine and/or a virtual machine hosted by a physical machine. The physical machine may be a rackmount server, a desktop computer, or other computing device. In one embodiment, one or more host computing device 104A-X includes a virtual machine managed and provided by a cloud provider system. Each virtual machine offered by a cloud service provider may be hosted on a physical machine configured as part of a cloud. Such physical machines are often located in a data center. The cloud provider system and cloud may be provided as an infrastructure as a service (IaaS) layer. One example of such a cloud is Amazon's® Elastic Compute Cloud (EC2®).

Each host computing device 104A-X may host one or more applications 135A-X. The applications 135A-X may be application servers, web servers, standalone applications, and so forth. Accordingly, host computing devices 104A-X may provide services to clients via applications 135A-X in some embodiments.

Each host computing device 104A-X may additionally mount or otherwise connect to one or more virtual drives 180A, 180B through 180X (e.g., one or more logical unit numbers (LUNs) and/or one or more virtual NVMe drives). Though each host computing device 104A-X is shown to mount a different virtual drive 180A-X, different host computing devices may mount or connect to the same virtual drive. Each virtual drive 180A-X is a logical storage device that maps a logical storage address space to physical storage address spaces of multiple storage devices (e.g., drives 150A, 150B, 150C through 150Z of storage server 101) or to another logical storage address space that in turn maps to physical storage address spaces. Additionally, a virtual drive 180A-X may map a logical storage address space to physical storage address spaces of storage devices on multiple different storage servers.

Storage server 101 includes multiple I/O controllers 108A, 108B through 108Y connected to multiple drives 150A, 150B, 150C through 150Z via a switch 110. The drives 150A-Z may be SAS/SATA drives, non-volatile memory express (NVMe) drives, small computer system interface (SCSI) over PCIe (SOP) drives, or drives that communicate using different protocols. The number of drives included in storage server 101 may be less than 10 to more than 100. The drives may have the same or different storage capacities. In some implementations, the number of host computing devices 104A-X, the number of I/O controllers 108A-Y, and the number of drives 150A-Z may be different from each other.

Each I/O controller 108A-Y is a device configured to connect one or more host computing devices 104A-X to one or more drives 150A-Z. Each I/O controller 108A-Y includes one or more network interface controllers (NICs) such as Ethernet NICs and/or other protocol adapters (e.g., such as FC, SAS/SATA, or Infiniband (IB) adapters) that connect that I/O controller to network 106. Each I/O controller 108A-Y additionally includes a port that connects to switch 110 via an internal bus. Though only a single switch 110 is shown, the I/O controllers 108A-Y may include multiple ports for connecting to multiple different switches and associated fabrics.

In one embodiment, I/O controllers 108A-Y include peripheral component interconnect express (PCIe) ports that connect to switch 110 via a PCIe bus. Alternatively, or additionally, I/O controllers 108A-Y may include small computer system interface (SCSI) ports, serial attached SCSI (SAS) ports, serial ATA (SATA) ports, Fibre Channel ports, or universal serial bus (USB) ports or other ports for connecting to the switch 110. I/O controllers 108A-Y may additionally include a volatile and/or non-volatile memory to store firmware and/or software for performing operations described herein. Volatile memory may also be used for a data cache or buffer (e.g., as a write cache and/or a read look ahead cache). For example, I/O controllers 108A-Y may include a main memory (e.g., read-only memory (ROM), flash memory, dynamic random access memory (DRAM) such as synchronous DRAM (SDRAM), etc.) and a static memory (e.g., flash memory, static random access memory (SRAM), etc.).

I/O controllers 108A-Y may additionally include a processing device representing one or more general-purpose processors such as a microprocessor, central processing unit, or the like. The term "processing device" is used herein to refer to any combination of one or more integrated circuits and/or packages that include one or more processors (e.g., one or more processor cores). Therefore, the term processing device encompasses a single core central processing unit (CPU), a multi-core CPU and a massively multi-core system that includes many interconnected integrated circuits, each of which may include multiple processor cores. The processing device may therefore include multiple processors. The processing device may include a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device may also be one or more special-purpose processing devices such as an application specific integrated circuit (ASIC), a field programmable gate array (FPGA), a digital signal processor (DSP), network processor, or the like. In one embodiment, each I/O controller 108A-Y is a system on a chip (SoC) including a processing device, a memory, one or more NICs and one or more internal ports.

Each I/O controller 108A-Y is assigned to one or more host computing devices 104A-X, and handles input/output (I/O) commands for those host computing devices. Applications 135A-X running on a host computing device 104A-X may attempt to read data from and/or write data to a virtual drive 180A-X that the host computing device 104A-X has access to (e.g., that has been presented to the host computing device 104A-X). Responsive to such a read or write request, the host computing device 104A-X sends a host command to the I/O controller 208A-X that is assigned to that host computing device 204A-X to initiate the read or write operation. As used herein, a host command is a read or write command that originates at a host computing device.

When the I/O controller 108A-Y receives a read or write command from the host computing device 104A-X, the I/O controller 108A-Y extracts the read or write command from the message and determines what logical addresses of the virtual drive 180A-X should be used to write the data to or read the data from. The I/O controller 108A-Y may additionally translate the logical addresses of the virtual drive to physical addresses of the drives 150A-Z. For example, if a read command is received, the I/O controller 108A-Y may determine which drives 150A-Z store the information to be read as well as which physical addresses on those drives the data should be read from.

The I/O controller 108A-Y may then generate one or more sub-commands directed to the determined drives 150A-Z to write data to those drives (e.g., to storage blocks on those drives) or read data from those drives 150A-Z (e.g., to read data from storage blocks on those drives). The I/O controller 108A-Y may additionally allocate buffer space for each of the sub-commands in a memory of the I/O controller 108A-Y. Once all sub-commands associated with a read command have been received from the applicable drives 150A-Z, I/O controller 108A-Y may then combine the data of each of the sub-commands that was stored in the buffer space and return the combined data as a response to the read command received from host computing device.

Switch 110 is a multi-port bridge that connects I/O controllers 108A-Y to drives 150A-Z (also referred to as storage devices). Switch 110 manages the flow of data within storage server 101 by connecting specific I/O controllers 108A-Y to specific drives 150A-Z on a message by message basis, allowing the switch 110 to regulate the flow of traffic. Each I/O controller 108A-Y and each drive 150A-Z connected to switch 110 can be identified using a unique address (e.g., a unique port address) of the I/O controller or drive. Switch 110 may be a PCIe switch, an Ethernet switch, a SAS or SATA expander, a USB switch, or other type of switch.

Drives 150A-Z may be disk drives, solid state drives (SSDs), or a combination of disk drives and SSDs. An SSD (also referred to as a solid state storage device) is a non-volatile storage device that uses integrated circuits to persistently store data. SSDs have numerous advantages over traditional disk drives. As compared to disk drives, SSDs are more resilient, consume less power, and have lower latency (access times). In one embodiment, SSDs are NAND-based Flash memory devices or NOR-based Flash memory devices. Flash memory devices are non-volatile and can be electronically erased and reprogrammed. Alternatively, one or more SSDs may be volatile memory-based solid state drives (e.g., dynamic random access memory (DRAM)-based SSDs) that have a battery backup. Drives 150A-Z may include one or more ports (e.g., PCIe ports) to connect to switch 110. Drives 150A-Z may connect to switch 110 via PCIe, SCSI, SAS, USB, or other connection protocols.

Each drive 150A-Z has a controller and a storage area that includes memory (e.g., NAND Flash non-volatile memory) or other physical storage to store data. The storage area may be divided into pages, which is the smallest unit of storage to which data may be stored in an SSD. SSD pages may have sizes based on a configuration of an SSD. For example, SSDs may have pages that are 4 kilobytes (kB), 8 kB, or 16 kB. However, other page sizes are also possible. SSD pages are grouped into SSD page groups that may be referred to as SSD blocks. Each SSD page group contains a particular number of pages, which is again dependent on a design of a particular SSD. Typical SSDs have page groups that include 256 pages. Notably, conventionally an SSD may only perform a write or a read to a single page in a page group at a time.

For SSDs such as Flash SSDs, to write over the contents of a memory page, that memory page must first be erased. However, SSDs such as Flash SSDs have asymmetric write and erase capabilities. In particular, for Flash memory devices reads and writes are performed on individual memory pages. However, erase operations are not performed on individual memory pages. Instead, erase operations are performed on entire page groups. Accordingly, rather than re-writing over a given memory page when contents of that memory page are changed, that specific memory page is marked as invalid and the changed data is written to a new memory page.

Each I/O controller 108A-Y includes a volume manager 109A-Y. The volume manager 109A-Y is responsible for generating and managing clones of storage volumes. A storage volume may be a virtual drive 180A-X. Alternatively, a virtual drive 180A-X may map to multiple storage volumes, were each storage volume maps to one or more underlying physical drives 150A-Z.

As discussed above, a clone of a storage volume is a new storage volume that references (e.g., uses) all of the storage blocks that are used by the storage volume that was cloned. Each storage block may correspond to the smallest discrete unit of storage on the drives 150A-Z, or to some larger amount of storage. For example, a storage block may be a single memory page on a drive 150A-Z, may be two memory pages on a drive 150A-Z, or may be more memory pages on a drive 150A-Z.

A volume manager 109A-Y may generate a clone of a storage volume automatically or in response to receipt of a command (e.g., from a host computing device 104A-X) to generate a clone. In an example, a volume manager 109A-Y may include instructions to automatically generate a clone of a storage volume on a periodic basis (e.g., to generate a clone of a storage volume once an hour, once a day, etc.).

When a volume manager 109A-Y generates a clone of a storage volume, that volume manager 109A-Y updates (e.g., increments) a global reference count (referred to herein as the global volume count) associated with that storage volume that was cloned. The global volume count represents how many clones have been created from that original storage volume (including clones of clones of the original storage volume). However, the volume manager 109A-Y does not perform any read or write operations to update metadata associated with the storage blocks in the cloned storage volume at that time. In particular, at the time of generating the clone the volume manager 109A-Y does not perform any input/output (I/O) operations on any of the drives 150A-Z to update storage blocks on those drives. Accordingly, there is nearly zero overhead associated with generating clones. Rather than updating the metadata of storage blocks responsive to generation of the clone, volume manager postpones the metadata updates for each storage block until a future I/O operation will cause an update to that storage block. When an I/O operation will cause an update to a storage block that is referenced by the clone, volume manager 109A-Y adds an additional instruction the I/O operation that causes a drive 150A-Z to update the metadata for that storage block before performing the I/O operation. Updating the metadata of the storage block may include updating a reference count for the storage block that indicates which storage volumes (including any clones) reference that storage block. The reference count for the storage block may be updated at that time based on a comparison of that storage block's reference count to the global volume count. Accordingly, no additional overhead is imposed to keep track of which storage volumes are referencing the storage blocks in drives 150A-Z. The volume manager 109A-Y is discussed in greater detail below with reference to FIG. 2.

Storage server 101 may additionally include a management module 115. Management module 115 may be a device configured to perform particular operations with regards to management of the array of drives 150A-Z. Management module 115 may include a processing device, a port for connecting to switch 110 and a NIC for connecting to network 106. Management module 115 may additionally include a volatile and/or non-volatile memory to store firmware and/or software for performing operations described herein. In one embodiment, management module 115 is a SoC.

The management module 115 determines how to configure the array of drives 150A-Z and further determines configurations for the one or more virtual drives 180A-X and/or storage volumes. For example, management module 115 may determine which virtual drives 180A-X and/or storage volumes map to which physical drives and which portions of those drives the virtual drives and/or storage volumes map to. Once these configurations are determined, management module 115 may send these configurations to the I/O controllers 108A-Y for implementation. Management module 115 additionally performs discovery operations and may be responsible for pairing I/O controllers 108A-Y with host computing devices 104A-X. The management module 115 may additionally include a volume manager in some embodiments, which may function similar to the aforementioned volume managers 109A-Y.

Figure 2:
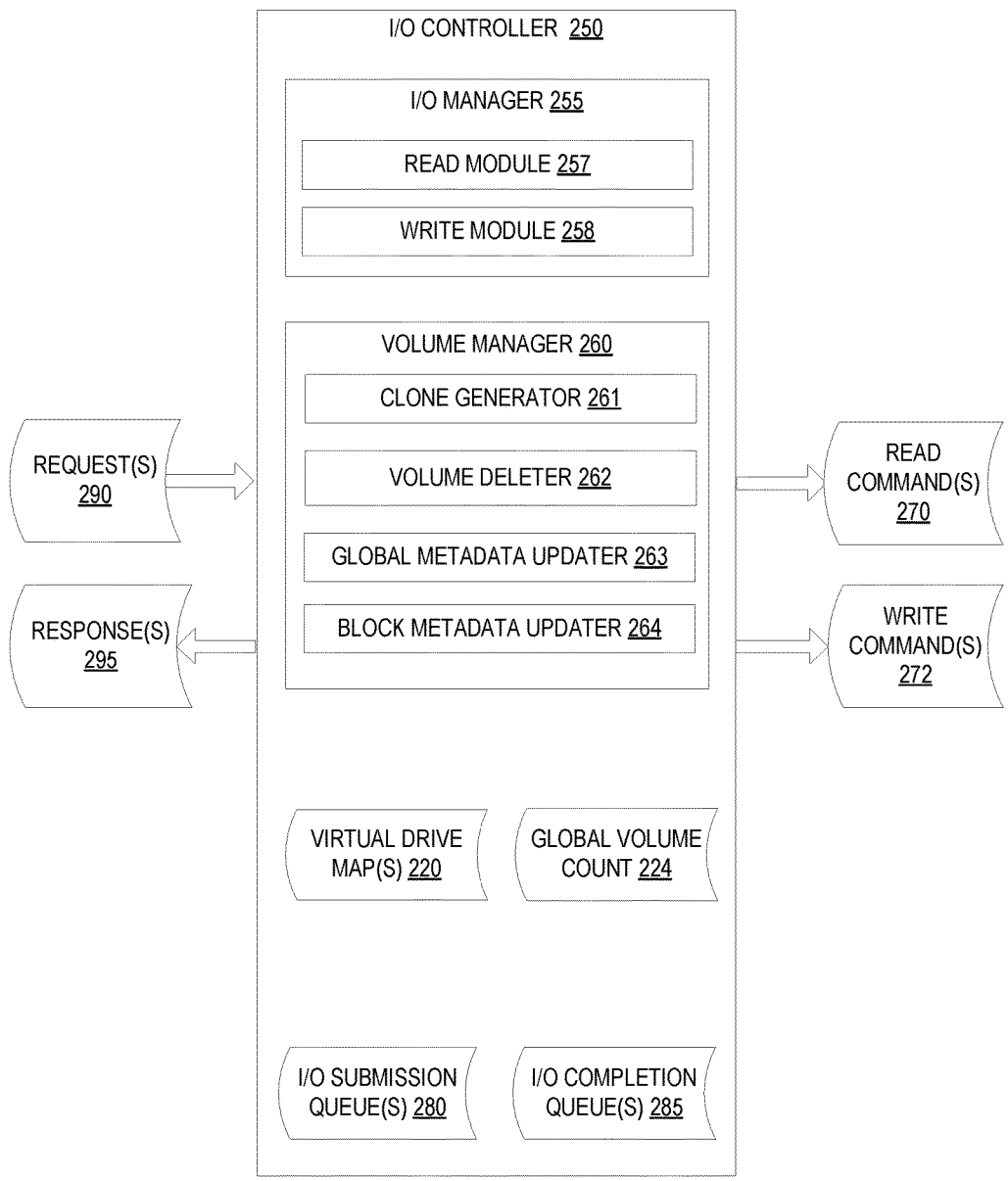
FIG. 2 is a block diagram of one embodiment of an I/O controller.

FIG. 2 is a block diagram of one embodiment of an I/O controller 250 showing logical modules that may be loaded into and executed by a processing device of I/O controller 250. Alternatively, I/O controller 250 may include one or more physical modules (e.g., an integrated circuit (IC) designed with described modules or a configurable logic such as a field programmable gate array (FPGA) configured to have the modules). In one embodiment, I/O controller 250 corresponds to an I/O controller 108A-Y of FIG. 1.

In one embodiment, I/O controller 250 includes the module of an input/output (I/O) manager 255 and the module of a volume manager 260. The I/O manager 255 in one embodiment includes a read module 257 and a write module 258. Alternatively, the read module 257 and/or write module 258 may be distinct modules that are separate from I/O manager 255. The volume manager 260 in one embodiment includes a clone generator 261, a volume delete 262, a global metadata updater 263 and a block metadata updater 264. Alternatively, the clone generator 261, volume delete 262, global metadata updater 263 and/or block metadata updater 264 may be distinct modules that are separate from volume manager 260. In some implementations, the volume manager 260 or one or more sub-modules of the volume manager 260 (e.g., the block metadata updater 264) are integrated into the I/O manager 255.

I/O manager 255 is responsible for communicating with host computing devices and satisfying input/output (I/O) commands such as read commands and write commands from the host computing devices. I/O controller 250 receives requests 290 from host computing devices. The requests 290 may be, for example, messages encapsulated as Ethernet packets. The received requests 290 may contain I/O commands and/or data. Responsive to receipt of a request 290 from a host, I/O manager 255 may remove an I/O command and/or data from the request and/or determine which module 257-258 should handle the data or I/O command.

Responsive to receipt of a read command, I/O manager 255 invokes read module 257. Read module 257 is responsible for responding to read commands. In one embodiment, the command payload of the read command identifies specific logical block addresses of a virtual storage device (e.g., a virtual NVMe drive) from which data is to be read. For example, the command payload may identify a particular logical block address and a length. Read module 257 may use virtual drive map 220 for the virtual drive to determine what locations (e.g., what storage blocks) on the drives correspond to the logical block addresses of the virtual drive.

Read module 257 may then generate read commands 270 for each of the drives storing data to be read. For example, if a virtual drive maps to three physical drives, read module 257 may determine a storage block on a first drive storing requested information, a second storage block on a second drive storing requested information and a third storage block on a third drive storing requested information. Read module 257 may then generate a first read command directed to the first storage block of the first drive, a second read command directed to the second storage block of the second drive, and a third read command directed to the third storage block of the third drive. The read commands may be placed into I/O submission queues 280 for each of the drives that are managed by the I/O manager. Once a read command reaches the front of an I/O submission queue 280, read module 257 may then send the generated read command to the appropriate drive.

Responsive to receipt of a write command, I/O manager 255 invokes write module 258. Write module 258 is responsible for responding to write commands. In one embodiment, the command payload of the write command identifies a length of data to be written. Write module 258 may determine what logical block addresses to write the data to, and may additionally determine what physical addresses on which drives (e.g., what storage blocks) to map to the logical block addresses and to write the data to. The write module 258 may update a virtual drive map (220) for a storage volume and/or virtual drive to show that the logical block addresses map to the physical addresses of the drives.

Write module 258 may then generate write commands 272 for each of the storage devices to which the data will be written. The write commands 272 may be placed into I/O submission queues 280 for each of the drives that are managed by the I/O manager. Once a write sub-request reaches the front of an I/O submission queue 280, write module 258 may then send the generated write command to the appropriate drive.

The drives receive the write commands and write the data portions to the specified locations (e.g., to specified physical storage blocks). The drives then return a completion notification. These completion notifications may be added to the I/O completion queue 285. Once completion notifications have been received from each of the drives to which data was written (and in some embodiments these completion notifications reach a front of the I/O completion queue), write module 258 may generate a response 295 (e.g., a new Ethernet packet having the above identified format). Write module 258 may then encapsulate the completion notification into the response 295. Write module 258 may then send the response 295 to the host.

Some write commands may specify logical block addresses that are to be overwritten. For example, a write command may be a command to modify data stored at a particular storage block. The virtual drives and/or storage volumes are managed using a log structured storage mechanism. Accordingly, existing data that is stored on the SSDs is not overwritten in space. For example, a command from a particular storage volume to modify the data that is stored at a logical block address that maps to a particular physical storage block for that storage volume does not cause new data to be written to that particular storage block. Instead, the logical block address is mapped to a new storage block, the modified data is written to that new storage block, and the particular physical storage block that had previously been mapped to the logical block address is invalidated for that storage volume.

As mentioned above, volume manager 260 includes a clone generator 261, a volume delete 262, a global metadata updater 263 and a block metadata updater 264. Clone generator 261 generates clones of storage volumes automatically or responsive to receiving create clone commands. Each clone is a new storage volume (e.g., a new logical block device) that references the storage blocks that are used by the storage volume being cloned.

When a clone of a storage volume is generated, global metadata updater 263 updates a global volume count 224 by incrementing the global volume count. The global volume count 224 is a count of the number of storage volumes that are based on the same original storage volume. The global volume count 224 may be maintained within memory of the I/O controller 250. Accordingly, zero I/O operations may be performed on any storage device that stores the storage blocks referenced by the cloned storage volume when the global volume count 224 is updated. Notably, global metadata updater 263 does not send I/O commands to drives that include storage blocks referenced by the clone when the clone is generated.

In one embodiment, the global volume count 224 is a bit sequence or other type of bitmap, referred to herein interchangeably as the global volume bitmap and global volume bit sequence. Each bit in the global volume bit sequence may represent a different storage volume. For example, a first bit may represent the original storage volume, a second bit may represent a first clone of the original storage volume, a third bit may represent a second clone of the original storage volume, and so on. A first bit value (e.g., a 1) for a particular bit position in the global volume bitmap indicates that a storage volume associated with that bit position exists. A second bit value (e.g., a 0) for a particular bit position in the global volume bitmap indicates that a storage volume associated with that bit position does not exist.

When a new clone is generated, the global volume bitmap may be updated by changing a value of a bit at a bit position that corresponds to the new clone (e.g., setting a bit at that bit position). For example, if there were 4 associated storage volumes prior to generation of a new clone, then the global volume count may start with a value of 111100000x. After the new clone is generated, the global volume count may be updated to 111110000x, where the $5^{th}$ bit position now indicates that a $5^{th}$ storage volume exists.

In one embodiment, the global volume bitmap is a bit sequence having a specified length. For example, the global volume bitmap may be a bit sequence of 64 bits. In such an example, a storage volume could conceivably have up to 63 clones. In another example, the global volume bitmap may be a bit sequence if 128 bits. In such an example, a storage volume could conceivably have up to 127 clones. Other bit sequence lengths may also be implemented to enable different numbers of clones.

Each storage block that is referenced by a storage volume has metadata that serves as a reference count to indicate a number of storage volumes that reference that storage block. As long as at least one storage volume references a storage block, that storage block will not be deleted. Once no more storage volumes reference that storage block, then garbage collection operations may be performed to reclaim that storage block for reuse.

The metadata of a storage block that indicates the reference count of volumes that reference that storage block may be a bitmap or other bit sequence in embodiments (referred to herein as a block bitmap or block bit sequence). The block bit sequence may have the same length (e.g., same number of bits) as the global volume bit sequence. Each bit in the block bit sequence represents the same storage volume as the corresponding block in the global volume bit sequence (e.g., as the global volume count 224). A first value (e.g., a 1) for a bit at a particular bit position in the bit sequence indicates that a storage volume associated with that bit position references the storage block. A second value (e.g., a 0) for a bit in a particular bit position in that bit sequence indicates that the storage volume associated with that bit position does not reference the storage block. Notably, the block bit sequence for a particular storage block is not updated when clones are created (e.g., when a new storage volume references the storage block). The block bit sequence is not updated until a storage volume will stop referencing that storage block. A storage volume will stop referencing the storage block when that storage volume is deleted or when the data at that storage block is deleted or modified for that storage volume.

As mentioned above, when a request is received to modify or overwrite data at a particular logical block address for a particular storage volume, the modified version of the data is instead written by write module 258 to a new storage block that is mapped to the particular logical block address. As a result, the new storage block becomes mapped to the particular storage volume. Write module 258 additionally writes to metadata (e.g., a block bitmap) of the new storage block to indicate that the particular storage volume now references the new storage block. The bit at the bit position associated with the particular storage volume is updated to indicate that the particular storage volume references that storage block. For example, if the particular storage volume was the first storage volume, then the bit at the first bit position in the block bitmap may be a 1. Other bits may be 0s to indicate that no other storage volumes reference the new storage block. In another example, if the particular storage volume is the $5^{th}$ clone of an original storage volume, then the bit at the $6^{th}$ bit position may be a 1, and other bits may be 0s.

In one embodiment, write module 258 invokes block metadata updater 264 responsive to receipt of a command to overwrite data (e.g., to modify data) for a storage volume and/or responsive to a command to delete data. Block metadata updater 264 may invalidate, for the storage volume, the storage block that was previously mapped to the logical block address that was to be modified or deleted. Alternatively, block metadata updater 264 may determine that the storage block has been invalidated.

Block metadata updater 264 additionally updates the metadata (e.g., block bitmap) for the storage block that was invalidated for a storage volume. The update of the block bitmap may include one or a sequence of update operations. The first update operation of the block bitmap is to compare the block bitmap to the global volume bitmap. If the global volume bitmap is larger than the block bitmap (e.g., includes additional storage volumes), then the block bitmap may be updated to indicate that the additional storage volumes reference the storage block (referred to herein as bitmap expansion). This may include carrying over the original value from the parent (e.g., from the bit at the first bit position if the clone was generated from the original storage volume) and replicating the parent's value to all bits for clones that have been added. For example, three clones may have been generated of a storage volume that references a storage block, and no previous rewrites or deletions may have occurred for the storage block in any of the clones or the original storage volume. Accordingly, the global volume bitmap may have values of 11110x, but the block bitmap may have values of 10000x. After comparison of the block bitmap for the storage block to the global volume bitmap, bitmap expansion may be performed to update the block bitmap to 11110x to show that the three clones reference that block bitmap. If the block bitmap indicates the same number of storage volumes as the global volume bitmap, then no bitmap expansion may be performed.

In some instances, a block may be modified or deleted for a most recently created storage volume that references that storage block. This would cause the bit value for the bit position corresponding to that most recently created storage volume to be switched (e.g., from a 1 to a 0). In a future block bitmap update, the block metadata updater 264 may not be able to determine whether a difference between the global volume bitmap and the block level bitmap is because a new storage volume was added (and the block bitmap has not yet been updated to reflect this) or because the block was invalidated for a most recent storage volume.

Accordingly, in one embodiment, the global volume bitmap (global volume count 224) includes one more set bit than there are storage volumes. The last set bit represents the total number of storage volumes, and is referred to herein as the marker bit. The total number of storage volumes may be determined by subtracting 1 from the bit position of the last set bit (e.g., from the bit position of the maker bit). In an example, if there is only a single storage volume, then the global volume bitmap would read 110000x, where the 1 at the second bit represents the marker bit and indicates that there is only one storage volume. In another example, if there are 17 storage volumes (1 original storage volume and 16 clones), then the marker bit would be at the 18$^{th}$ bit position. The global volume bitmap in such an example would be 1111111111111111110x.

The marker bit is also used in the block bitmaps. The global volume bitmap may be compared to the block bitmap to determine whether the bit position for the marker bit is different between the global volume bitmap and the block bitmap. If the bit position of the marker bit is the same for the block bitmap and the global volume bitmap, then no bitmap expansion will be performed. However, if the marker bit is at a higher bit position for the global volume bitmap than for the block bitmap, then bitmap expansion is performed for the block bitmap. Accordingly, regardless of the states of the bits associated with the various storage volumes, the market bit will show how many storage volumes referenced a storage block when the metadata for that storage block was last updated. In a first example, assume that a block bitmap reads 11001 and a global volume bitmap reads 11111 during a metadata update for that storage block. Since the marker bits have the same bit position (the 5$^{th}$ bit position), no bitmap expansion is performed. In a second example, assume that the block bitmap reads 11100 and the global volume bitmap reads 11111 during the metadata update for the storage block. Since the marker bit is at a bit position that is two positions greater in the global volume bitmap than in the block bitmap, bitmap expansion will be performed for the block bitmap to switch the bit for the 5$^{th}$ bit position to a 1 (and thus move the marker bit to the 5$^{th}$ bit position).

As part of bitmap expansion, block metadata updater 264 determines whether the bit position that previously corresponded to the marker bit and any additional bit positions between that bit position and the new bit position for the marker bit should be 1s or 0s. In one embodiment, the values of the previous marker bit position and any additional bit positions between the previous marker bit position and the new marker bit positions adopt the same value as the value of the first bit position. In the second example above, the block bitmap would read 11111 after bitmap expansion. In contrast, if the block bitmap initially read 01100, then after bitmap expansion the block bitmap would read 01001.

Once bitmap expansion is performed (or if it is determined that bitmap expansion is not to be performed), then the block bitmap is updated to indicate that the storage volume for which the storage block was invalided no longer references that storage block. This operation is referred to herein as bitmap correction. The bitmap correction is performed by switching the value of the bit associated with the storage volume for which the storage block was invalidated. For example, if the storage block was invalidated for the first storage volume, then the first bit may be unset or switched from a value of 1 to a value of 0. At this point the block bitmap may be up-to-date, and may accurately indicate those storage volumes that reference the storage block.

In some embodiments, one bit in each global volume bitmap and block bitmap is reserved for read-only copies of a storage volume, referred to herein as snapshots. Snapshots may be similar to clones, except that they are not writable. A single set bit in a global volume bitmap and/or block bitmap may represent any number of read-only copies. In one embodiment, the last bit or second to last bit in each bitmap is used for one or more snapshots.

Volume deleter 262 is responsible for performing operations for deletion of a storage volume. Volume deleter 262 may delete a volume responsive to receipt of a command to delete a volume. When a volume is deleted, volume deleter 262 invokes global metadata updater 263 to update the global volume count, and additionally invokes block metadata updater 264 to update the block metadata of each of the storage blocks referenced by the deleted storage volume.

Global metadata updater 263 may then update the global volume count (e.g., the global volume bitmap) by switching the value of the particular bit at the bit position associated with the deleted storage volume (e.g., unsetting the bit). In addition, global metadata updater 263 may generate a second global volume bitmap. In the second global volume bitmap, all bits of the first global volume bitmap that follow the particular bit are shifted one bit position. As a result of the shifted the bit positions, a length of the second global volume bitmap is one less than the length of the first global volume bitmap. In an example, assume that the global volume bit sequence initially reads 11110x, and that the second storage volume is deleted. Accordingly, the global volume bit sequence is updated to 10110x. A second global volume bit sequence is also created that reads 11100x. The first global volume bitmap may be referred to as the original global volume bitmap, and the second global volume bitmap may be referred to as the active global volume bitmap.

Responsive to being invoked by volume deleter 262, block metadata updater 264 performs one or a sequence of block metadata update operations for each of the storage blocks referenced by the deleted storage volume. The sequence of block metadata update operations may be similar to those discussed above with reference to invalidating a storage block for a storage volume. The first block metadata operation that may be performed is a comparison of the block bitmap to the first (or original) global volume bitmap. Bitmap expansion may then be performed (as described above) if the marker bit for the first global volume bitmap is at a later bit position than the marker bit for the block bitmap. Following bitmap expansion, or if no bitmap expansion is to be performed, bitmap correction is performed. In particular, the value of the bit at the bit position associated with the deleted storage volume is switched (e.g., from a 1 to a 0).

Following bitmap correction, the corrected block bitmap may be compared to the second (or active) global volume bitmap and/or again to the first (or original) global volume bitmap. Since the storage volume was deleted, there is no reason to any longer represent that storage volume in the bitmaps. Accordingly, based on the comparison, global metadata updater 263 may determine to slide the bits following the bit position of the deleted storage volume one bit position in the block bitmap. This process is referred to herein as bitmap compaction. In an example, assume that the first global volume bitmap reads 10110x, the second global volume bitmap reads 11100x, and a block bitmap that is to be updated reads 10110x after bitmap correction. The value of the second bit position is updated to reflect the value of the third bit position, and the value of the third bit position is updated to reflect the value of the fourth bit position. Accordingly, bitmap compaction causes the block bitmap to read 11100x.

Once the block metadata for all storage blocks referenced by a deleted storage volume have been updated, then the first global volume bitmap can be deleted. The active bitmap then becomes the only global volume bitmap for a set of storage volumes until another storage volume is deleted.

Figure 3:
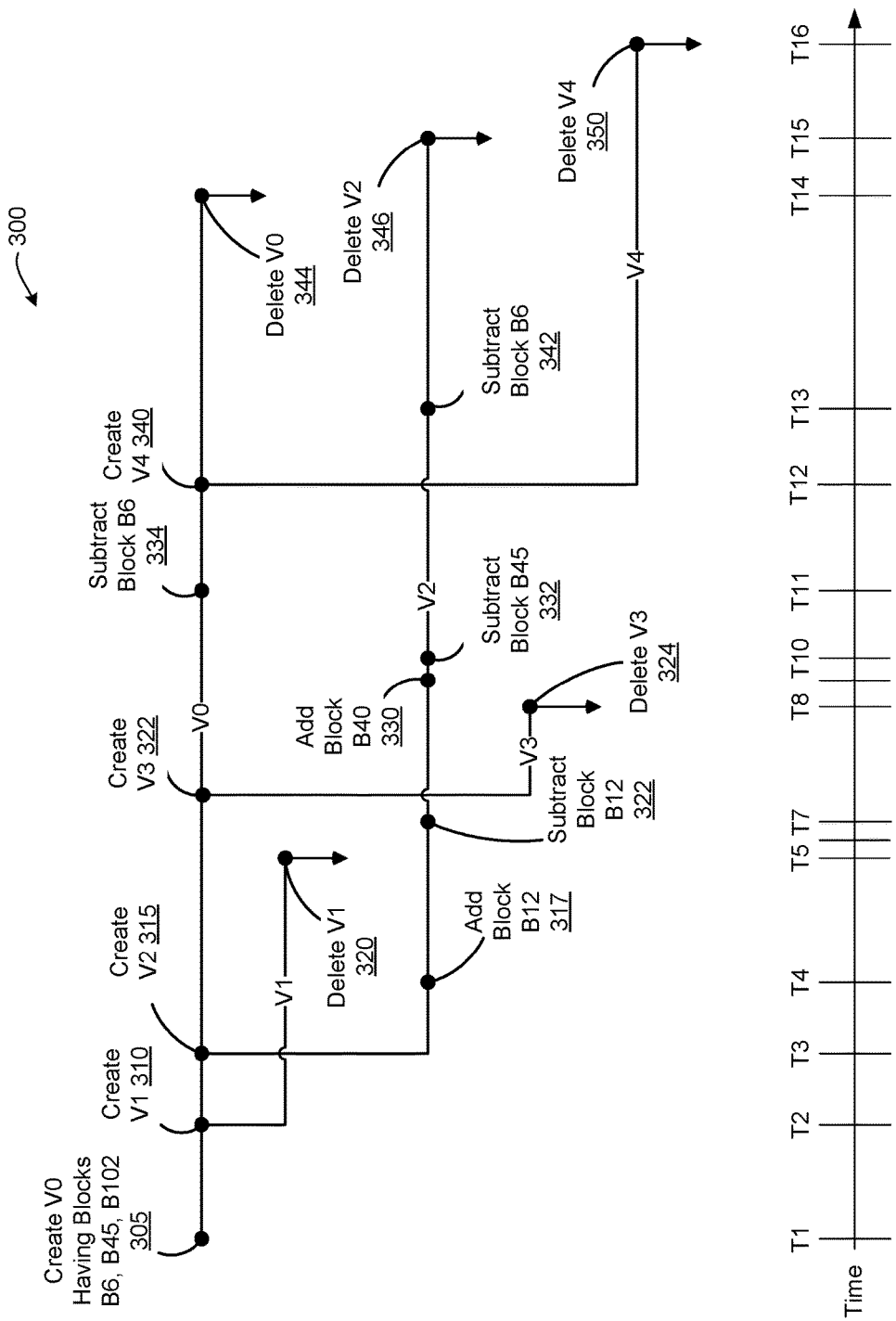
FIG. 3 is a diagram showing an example timeline of operations associated with a storage volume, in accordance with one embodiment of the present invention.

FIG. 3 is a diagram showing an example timeline 300 of operations associated with a storage volume, in accordance with one embodiment of the present invention. The example timeline 300 provides an illustration of how a global volume count (global volume bitmap) and how block reference counts (block bitmaps) of storage blocks are updated after various operations to better illustrate some implementations of the present invention. FIGS. 4A-D illustrate the states of bitmaps used to manage the storage volumes of FIG. 3 at various points of time on the timeline 300. The Following discussion will refer to FIGS. 3-4D.

At time T1 of the timeline 300a, storage volume V0 is created 305. The storage volume V0 includes storage blocks B6, B45 and B102 at the time of creation. Storage volume V0 is represented by a horizontal line labeled V0 in the timeline 300. FIG. 4A shows the state of a first global volume bitmap 405 and the states of the block B6 bitmap 410, block B45 bitmap 415 and block B102 bitmap 420 at time T1. As shown, the global volume bitmap 405 and each of the block bitmaps 410, 415, 420 start with the values of 1100000. The first set bit in global volume bitmap 405 indicates that storage volume V0 exists. The second set bit in the global volume bitmap 405 is the marker bit, and indicates that there is only a single storage volume. The first set bit in the block bitmaps 410, 415, 420 indicates that each of storage blocks B6, B45 and B102 is referenced by storage volume V0. The second set bit in the block bitmaps 410, 415, 420 indicates that at the time that these block bitmaps were updated there was only a single storage volume V0 in existence.

Referring back to FIG. 3, at time T2 a clone V1 of storage volume V0 is created 310. Clone V1 is represented by the horizontal line labeled V1. FIG. 4A shows the state of first global volume bitmap 405 and the states of the block B6 bitmap 410, block B45 bitmap 415 and block B102 bitmap 420 at time T2. As shown, the global volume bitmap 405 is updated to show the existence of clone V1. At time T2 the third bit in the global volume bitmap 405 is now the marker bit, and is set to show that there are two storage volumes. At time T2 each of the block bitmaps 410, 415, 420 is unchanged, and so still have the values of 11000000.

Referring back to FIG. 3, at time T3 another clone V2 of storage volume V0 is created 315. Clone V2 is represented by the horizontal line labeled V2. Referring again to FIG. 4A, at time T3 the global volume bitmap 405 is updated to show the existence of clone V2. At time T3 the fourth bit in the global volume bitmap 405 is now the marker bit, and is set to show that there are three storage volumes. At time T3 each of the block bitmaps 410, 415, 420 is unchanged, and so still have the values of 11000000.

At time T4 a new storage block B12 is added to clone V2. The first global volume bitmap at time T4 is unchanged with a value of 11110000. Similarly, at time T4 each of the block bitmaps 410, 415, 420 is unchanged, and so still have the values of 1100000. At time T4, block B12 bitmap 425 has a value of 00110000. At the time that block B12 is created, the marker bit for the block B12 bitmap 425 has the same bit position as the marker bit for the first global volume bitmap 405. Since block B12 was newly added for clone V2, storage volume V0 and clone V1 do not reference the storage block. Accordingly, the values for the first and second bit positions in the block B12 bitmap are unset (e.g., are 0). Since clone V2 references block B12, the bit is set at the third bit position in block B12 bitmap 425.

At time T5 clone V1 is deleted. Referring to FIG. 4B, at time T5 the first global volume bitmap 405 is updated to have the values of 10110000. The bit at the second bit position that is associated with clone V1 has been flipped to a 0 to indicate that clone V1 has been deleted. When a delete volume operation is performed, a second global volume bitmap 430 is generated. In the second global volume bitmap 430, all of the bits to the left of the bit position associated with the deleted storage volume represented in the first global volume bitmap 405 are unchanged. However, in the second global volume bitmap 430, all of the bits to the right of the bit position associated with the deleted storage volume represented in the first global volume bitmap 405 are shifted one space to the left. Accordingly, the second global volume bitmap 430 does not include any bits that are associated with the deleted clone V1. The second bit position in the second global volume bitmap 430 is associated with clone V2.

Figure 5:
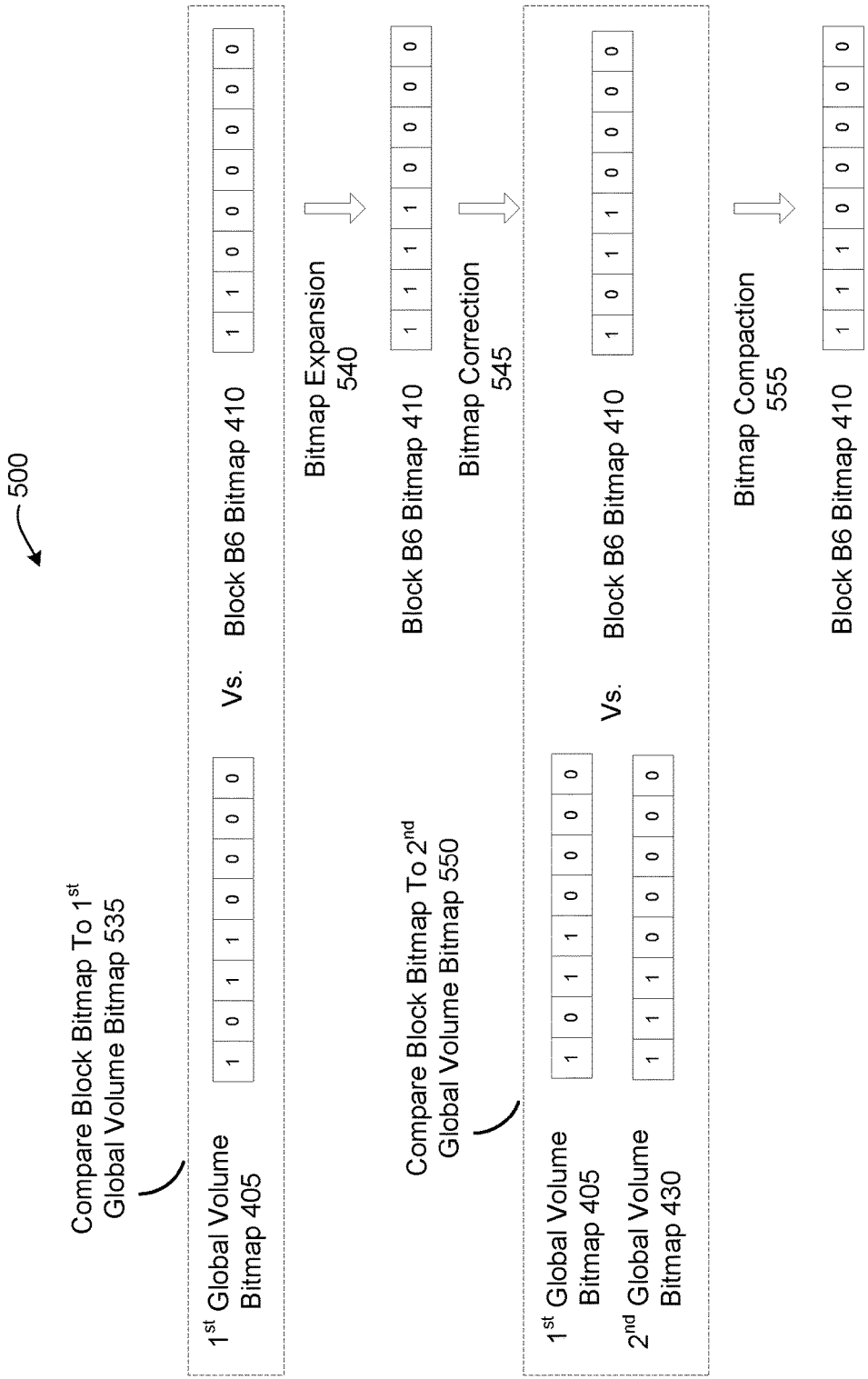
FIG. 5 illustrates the manipulation of a bitmap for a storage block after a storage operation, in accordance with one embodiment.

Blocks B6, B45, and B102 were referenced by clone V1. Accordingly, at the time of deletion of clone V1 the block bitmaps 410, 415, 420 for Blocks B6, B45 and B102 are updated. FIG. 5 shows a sequence 500 of metadata update operations to update block B6 bitmap 410. At block 535 of sequence 500 the block B6 bitmap 410 is compared to the first global volume bitmap 405. The marker bit for the first global volume bitmap 405 is at a later bit position than the marker bit for the block B6 bitmap 410. Accordingly, bitmap expansion 540 is subsequently performed to update the block B6 bitmap 410. The bitmap expansion 540 operation updates the block B6 bitmap 410 to reflect the previous generation of clone V1 and Clone V2. The metadata updates to reflect the clone creations of V1 and V2 were postponed until the command to delete clone V1.

After bitmap expansion, block B6 bitmap 410 reads 11110000. Subsequently, bitmap correction 545 is performed to reflect the deletion of clone V1. Accordingly, for bitmap correction the block B6 bitmap 410 is updated to 10110000.

After bitmap correction 545, bitmap compaction 555 is performed. To perform bitmap compaction, the block B6 bitmap 410 may be compared again to the first global volume bitmap the block B6 bitmap 410 and/or to the second global volume bitmap 430. The unset bit to the left of the marker bit in the first global volume bitmap 405 shows which storage volume was deleted (clone V1 in this example). For bitmap compaction 555, the bit values for each of the bit positions to the right of the bit position for the unset bit in the first global volume bitmap 405 are shifted one position to the left in the block B6 bitmap 410. Accordingly, after bitmap compaction 555 the block B6 bitmap reads 11100000.

Referring back to FIGS. 3 and 4A-D, at time T5 the block B45 bitmap 410 and block B102 bitmap 420 are updated in the same manner as described above for the block B6 bitmap 410. Storage block B12 was not referenced by clone V1. Accordingly, the block B12 bitmap 425 may not be updated responsive to the deletion of clone V1. Alternatively, the block B12 bitmap 425 may be updated even though block B12 was not referenced by clone V1. If the block B12 bitmap is not updated, then the block B12 bitmap 425 would continue to read 00110000.

At time T6 block B12 is subtracted 321 from clone V2. Block B12 may be subtracted from clone V2, for example, if block B12 is to be overwritten or deleted. The block B12 bitmap is compared to the first global volume bitmap 405. Since the marker bit position is the same for the first global volume bitmap 405 and the block B12 bitmap 425, no bitmap expansion is performed. The bit at the bit position that is associated with volume V2 in the block B12 bitmap 425 is then flipped or unset (e.g., to a 0). Subsequently, bit compaction may be performed to cause the marker bit for the block B12 bitmap 425 to correspond to the marker bit in the second global volume bitmap 430. At this point all block bitmaps have been updated to reflect the volume count indicated in the second global volume bitmap 430. Accordingly, the first global volume bitmap 405 may be deleted. Alternatively, the first global volume bitmap 405 may be updated to match the second global volume bitmap 430, and the second global volume bitmap 430 may be deleted. Additionally, no storage volumes reference (e.g., use) block B12. Accordingly, block B12 (and its block B12 bitmap 425) may be invalidated and then later erased during garbage correction operations.

At time T7 another clone V3 of storage volume V0 is created 322. Clone V3 is represented by the horizontal line labeled V3. At time T7, the second global volume bitmap 430 is updated to show the existence of clone V3. Accordingly, the fourth bit in the second global volume bitmap 430 is now the marker bit, and is set to show that there are three storage volumes. The second global volume bitmap 430 now has the values 11110000. At time T7 each of the block bitmaps 410, 415, 420 is unchanged, and so still have the values of 11100000.

At time T8 clone V3 is deleted 324. The second global volume bitmap 430 is updated to have the values of 11010000. The bit at the third bit position that is associated with clone V3 has been unset to indicate that clone V3 has been deleted. Third global volume bitmap 432 is also generated, the third global volume bitmap 435 having the values 11100000. Block B6 bitmap 410, block B45 bitmap 415 and block B102 420 are then updated to each read 11100000. The second global volume bitmap 430 may then be deleted because all of the block bitmaps 410, 415, 420 have been updated to reflect the volume count in the third global volume bitmap 435.

At time T9 a new storage block B40 is added 330 to clone V2. The third global volume bitmap 432 at time T9 is unchanged with a value of 11100000. Similarly, at time T9 each of the block bitmaps 410, 415, 420 is unchanged, and so still have the values of 1110000. At time T9, block B40 bitmap 425 has a value of 00110000. At the time that block B40 is created, the marker bit for the block B40 bitmap 435 has the same bit position as the marker bit for the third global volume bitmap 432. Since block B40 was newly added for clone V2, storage volume V0 does not reference the storage block. Accordingly, the value for the first bit position in the block B40 bitmap is unset (e.g., is 0). Since clone V2 references block B40, the bit is set at the second bit position in block B40 bitmap 435.

At time T10 block B45 is subtracted 332 from clone V2. The third global volume bitmap 432 is unchanged. Similarly, the block B6 bitmap 410, block B102 bitmap 420, and block B40 bitmap 435 are unchanged. The block B45 bitmap 415 is updated to 10100000.

At time T11 block B6 is subtracted 334 from storage volume V0. The third global volume bitmap 432 is unchanged. Similarly, the block B102 bitmap 420, block B45 bitmap 415 and block B40 bitmap 435 are unchanged. The block B6 bitmap 410 is updated to 01100000.

At time T12 another clone V4 of storage volume V0 is created 340. Clone V4 is represented by the horizontal line labeled V4. At time T12, the third global volume bitmap 432 is updated to show the existence of clone V4. Accordingly, the fourth bit in the third global volume bitmap 432 is now the marker bit, and is set to show that there are three storage volumes. The third global volume bitmap 432 now has the values 11110000. At time T12 each of the block bitmaps 410, 415, 420, 435 is unchanged.

At time T13 block B6 is subtracted 342 from storage volume V2. The third global volume bitmap 432 is unchanged. Bitmap expansion is performed for the block B6 bitmap 410 to update the block B6 bitmap to 01010000. Since the clone V3 was generated from storage volume V0 and storage volume V0 did not reference block B6 at the time of its creation (indicated by an unset bit in the first bit position for the block B6 bitmap 410), the bit at the bit position for the clone V3 is unset in the block B6 bitmap 410 after bitmap expansion. Bitmap correction is then performed to unset the bit at the second bit position in the block B6 bitmap (to indicate that block B6 has been subtracted from clone V2). Accordingly, the block B6 bitmap 410 is updated to 00010000. No volumes are using Block B6, so it can be subject to garbage collection operations (e.g., erased).

At time T14 storage volume V0 is deleted 344. The third global volume bitmap 432 is updated to have the values of 01110000. Fourth global volume bitmap 440 is also generated, the fourth global volume bitmap 440 having the values 11100000. Block B45 bitmap 415, block B102 bitmap 420 and block B49 bitmap 435 are then updated as shown. The third global volume bitmap 432 can then be deleted.

At time T15 clone V2 is deleted 346. The fourth global volume bitmap 440 is updated to have the values of 01100000. Fifth global volume bitmap 445 is also generated, the fifth global volume bitmap 445 having the values 11000000. Block B45 bitmap 415, block B102 bitmap 420 and block B49 bitmap 435 are then updated as shown. The fourth global volume bitmap 440 can then be deleted.

At time T16 clone V4 is deleted 350. The fifth global volume bitmap 445 is updated to have the values of 01000000. Sixth global volume bitmap 450 is also generated, the sixth global volume bitmap 450 having the values 10000000. Block B45 bitmap 415, block B102 bitmap 420 and block B49 bitmap 435 are then updated as shown. The marker bit for the sixth global volume bitmap 450 is now at the first bit position, indicating that there are no storage volumes. Accordingly, the global volume bitmaps 445, 450 can be deleted and the storage blocks B45, B102 and B40 can be garbage collected.

Figure 6:
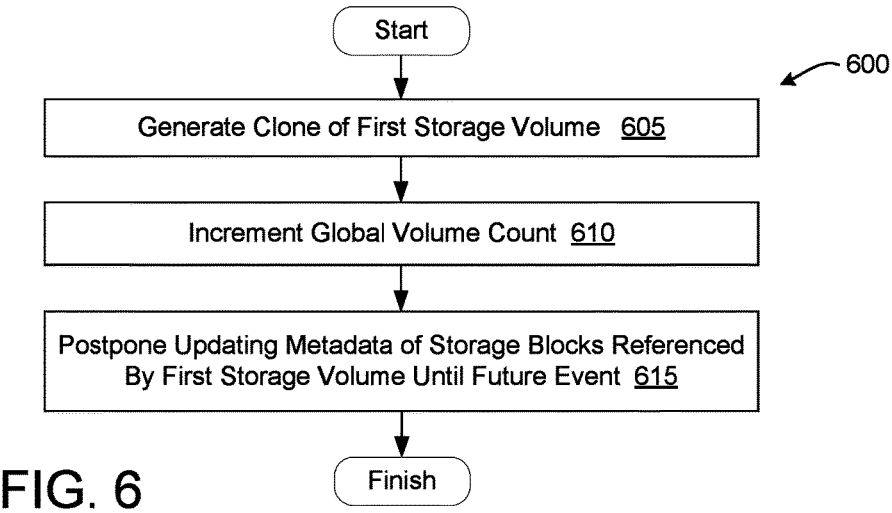
FIG. 6 is a flow diagram of one embodiment for a method of generating a clone of a storage volume with minimal overhead.
Figure 7:
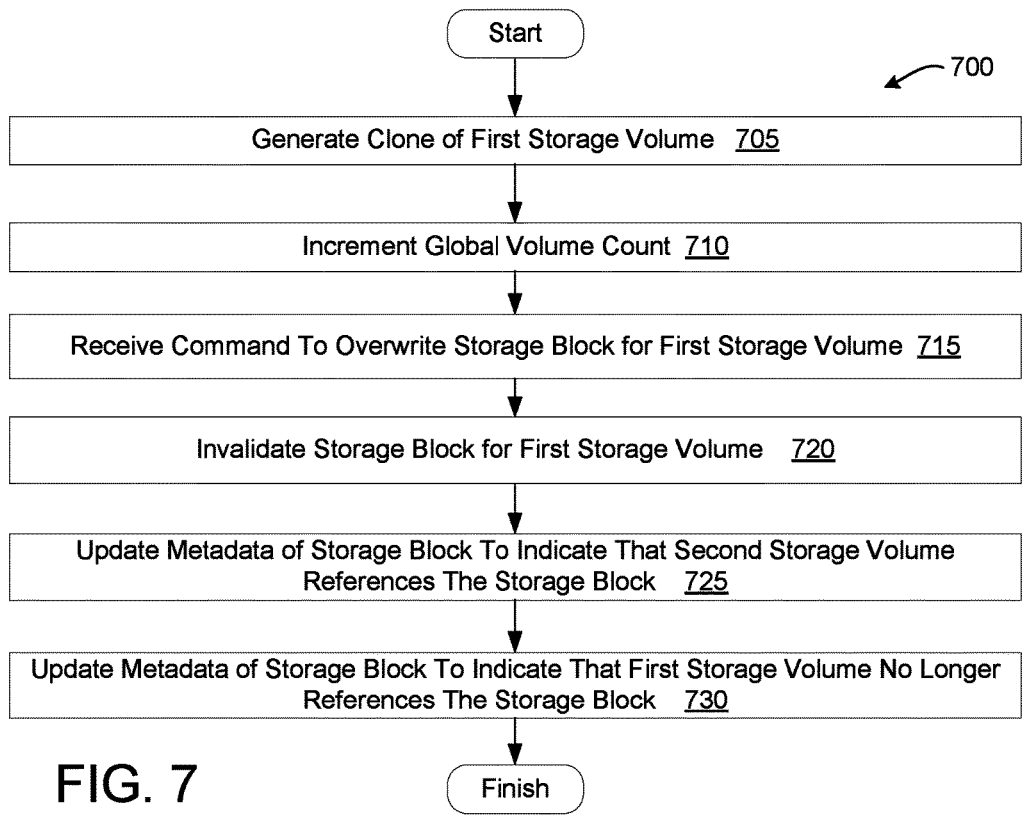
FIG. 7 is a flow diagram of one embodiment for a method of updating metadata for a storage block after a command to modify contents of the storage block.
Figure 8:
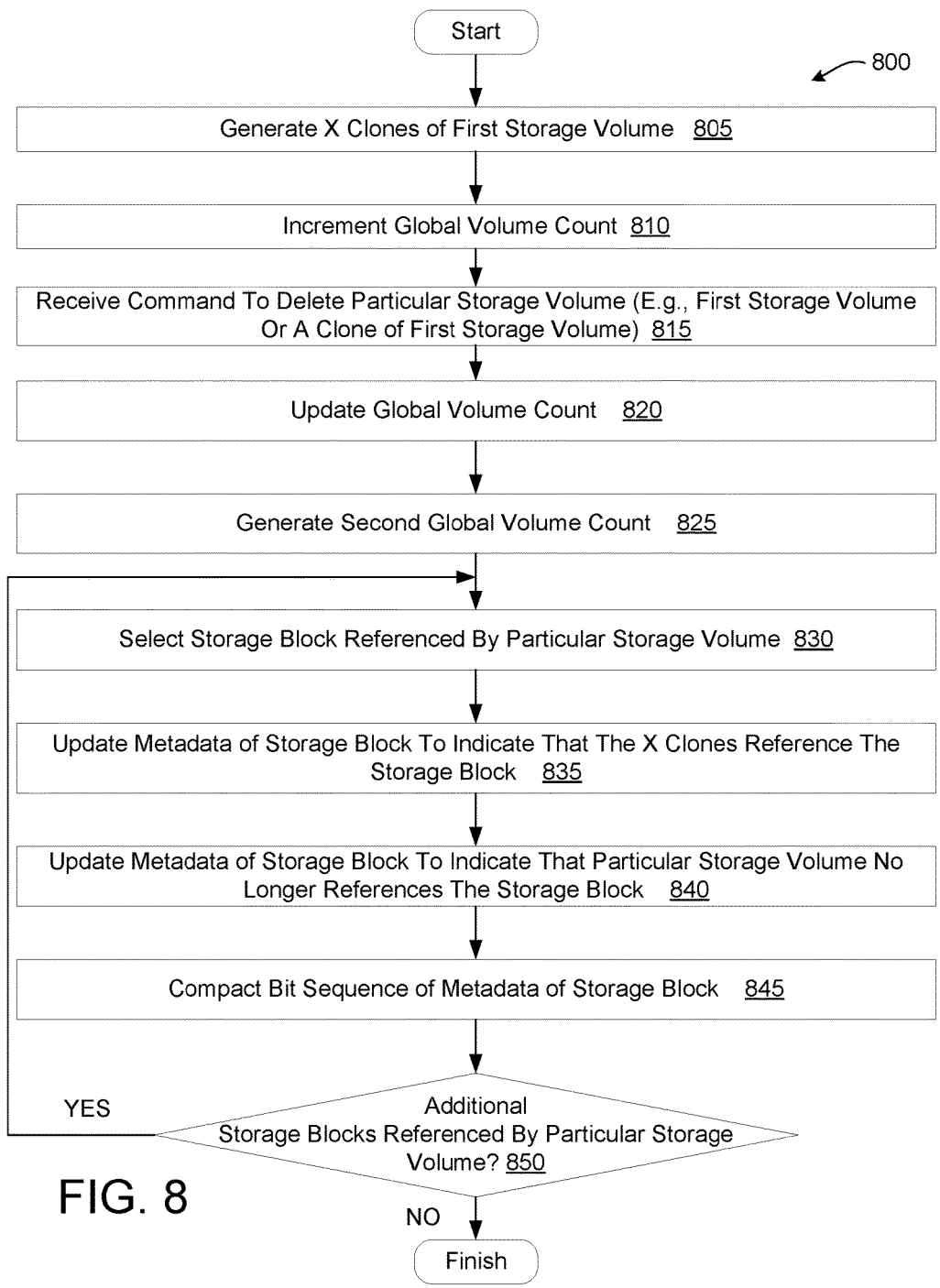
FIG. 8 is a flow diagram of one embodiment for a method of updating metadata for a group of storage blocks after a command to delete a storage volume that references the group of storage blocks.

FIGS. 6-8 are flow diagrams of various implementations of methods related to management of reference counts to volumes and clones for storage blocks. The methods are performed by processing logic that may include hardware (circuitry, dedicated logic, etc.), software (such as is run on a general purpose computer system or a dedicated machine), or a combination of both. Some methods may be performed by a volume manager such as volume managers 109A-Y of FIG. 1 or volume manager 260 of FIG. 2. The methods may be performed by an I/O controller such as any I/O controller 108A-Y of FIG. 1 or I/O controller 250 of FIG. 2. The methods may also be performed by a processing device of a server computer, a desktop computer, or any other computer that includes or manages an array of storage devices.

For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

FIG. 6 is a flow diagram of one embodiment for a method 600 of generating a clone of a storage volume with minimal overhead. At block 605 of method 600, processing logic generates a clone of a first storage volume. At bock 610, processing logic increments a global reference count that indicates a number of clones of the first storage volume (including clones of clones of the first storage volume). The global reference count is a bitmap or bit sequence in some embodiments, where each bit in the bitmap or bit sequence is associated a different storage volume (e.g., with the first storage volume or a particular clone of the first storage volume). At block 615, processing logic postpones metadata updates to the metadata of storage blocks references by the first storage volume until a future event. For each storage block, the metadata update for that storage block to reflect the new clone of the first storage volume is not performed until another metadata update operation to subtract a reference to at least one storage volume (e.g., first storage volume or a clone) will be performed. At that time, the metadata update for addition of the new clone is added, followed by the second metadata update subtracting the reference to at least one storage volume. By postponing the metadata update of the storage blocks that are used by the first storage volume until a later time at which the storage block will be freed for a storage volume, the expensive operations of incrementing reference counts of each storage block during clone creation can be avoided. Since the reference counts of storage blocks are postponed until a time to free the storage block for a storage volume, the I/O operations associated with reference count maintenance can be greatly reduced.

FIG. 7 is a flow diagram of one embodiment for a method 700 of updating metadata for a storage block after a command to modify contents of the storage block. At block 705 of method 700, processing logic generates a clone of a first volume. At block 710, processing logic increments a global volume count. Metadata update operations for storage blocks used by the clone are postponed until a later event.

At block 715, processing logic receives a command to overwrite a storage block for the first storage volume. At block 720, processing logic invalidates the storage block for the first storage volume. At block 725, processing logic updates metadata of the storage block to indicate that the second storage volume references the storage block. This is the metadata update operation that was postponed after the creation of the clone. At block 730, processing logic updates the metadata of the storage block to indicate that the first storage volume no longer references the storage block.

The operations described above at blocks 715-730 were described with reference to overwriting data of a storage block used by the first storage volume. However, it should be understood that similar operations may also be performed responsive to commands to overwrite storage blocks for any of the clones of the first storage volume.

FIG. 8 is a flow diagram of one embodiment for a method 800 of updating metadata for a group of storage blocks after a command to delete a storage volume that references the group of storage blocks. At block 805 of method 800, processing logic generates X clones of a first volume, where X may be any number from 1 to a maximum number of allowed clones. At block 810, processing logic increments a global volume count. The global volume count may be incremented with each new clone that is generated.

At block 815, processing logic receives a command to delete a particular storage volume, where the particular storage volume is either the first storage volume or a clone of the first storage volume. At block 820, processing logic updates the global volume count to indicate that the particular storage volume is to be deleted. The global volume count may be a first bitmap (e.g., a first bit sequence) that indicates the current storage volumes associated with the first storage volume. At block 825, processing logic generates a second global volume count. The second global volume count may be a second bit sequence that does not reference the particular storage volume, wherein states of all bits that follow the particular bit in the first bit sequence are shifted one position in the second bit sequence. The first global reference count (e.g., first bit sequence) may be an original bit sequence, and the second global reference count (e.g., second bit sequence) may be an active bit sequence.

At block 830, processing logic selects a storage block referenced by the particular storage volume. At block 835, processing logic updates metadata of the storage block to indicate that the X clones reference the storage block. These update operations were not performed at the time of clone creation, and were instead postponed until the volume deletion operation. At block 840, processing logic further updates the metadata of the storage block to indicate that the particular storage volume no longer references the storage block. At block 845, processing logic performs bitmap compaction to compact the metadata of the storage block. The operations of blocks 835-845 may be performed in a single I/O operation (e.g., as part of a single write command to a storage device that contains the storage block).

At block 850, processing logic determines whether any additional storage blocks are referenced by the particular storage volume. If there are additional storage blocks referenced by the particular storage volume that have not yet had their metadata updated, the method returns to block 830 and another storage block referenced by the particular storage volume is selected. If all storage blocks referenced by the particular storage volume have had their metadata updated, the method ends.

Figure 9:
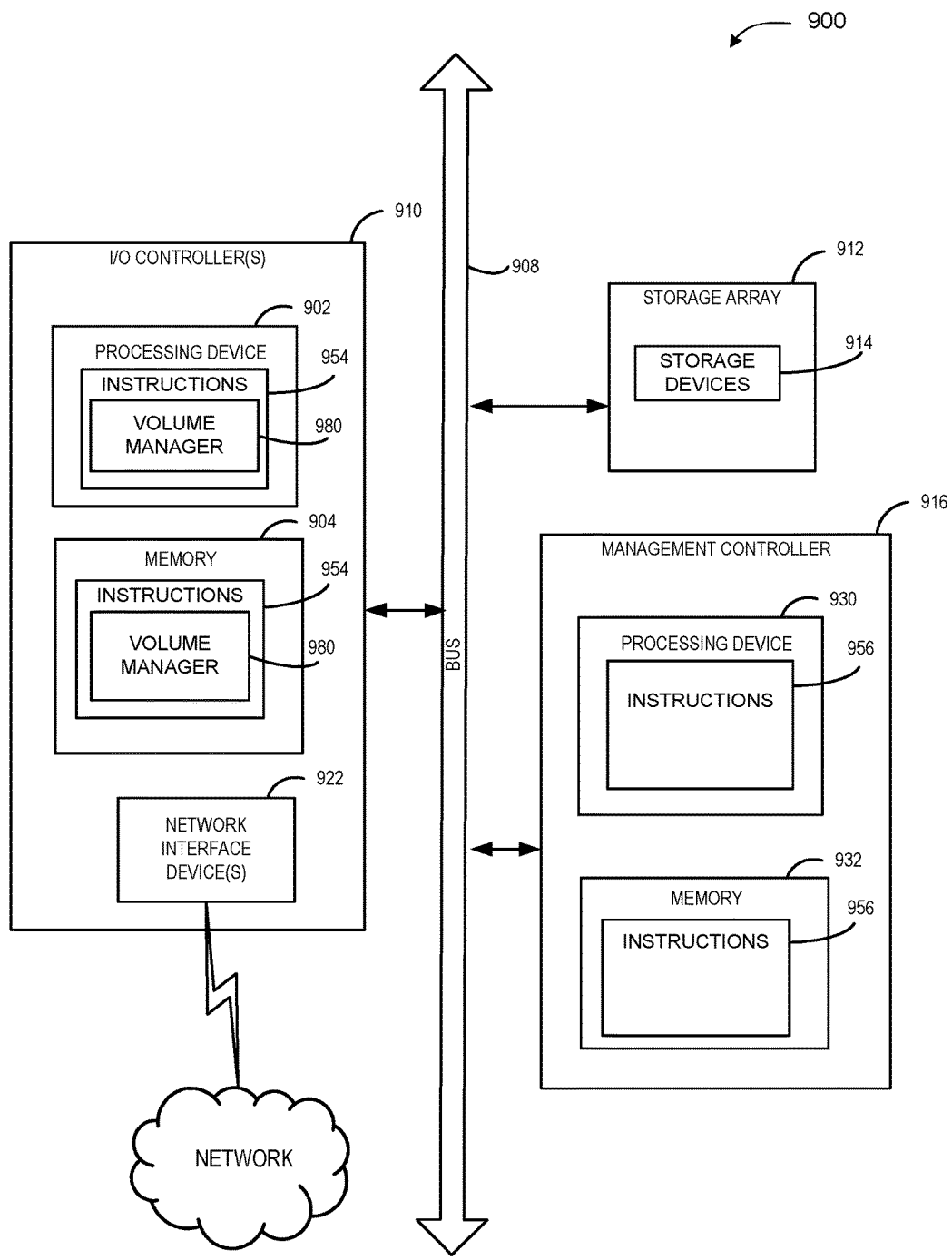
FIG. 9 illustrates an example computing device, in accordance with one embodiment.

FIG. 9 illustrates a diagrammatic representation of a machine in the example form of a computing device 900 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a hardware storage server, and may provide storage to hosts using one or more of a storage area network (SAN) or network attached storage (NAS) methodology. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computing device 900 includes one or more I/O controllers 910, a storage array 912, and a management controller 916 (or multiple management controllers 916), which communicate with each other via a bus 908. Bus 908 may include one or more switches (e.g., switch 110 of FIG. 1) and one or more storage fabrics (also referred to as backplane fabrics). Each storage fabric includes hardware (e.g., switches, etc.) that connects I/O controllers 910 to storage devices 914. Each storage fabric may include a fabric board (e.g., a printed circuit board (PCB) that includes multiple hardware components. Alternately, multiple storage fabrics may be part of a single backplane printed circuit board (PCB). Each storage fabric enables any I/O controller 910 to connect to any SSD 914. Each storage fabric may be independent of other storage fabrics, using its own hardware, ports, connections, etc. that are distinct from those used by the other storage fabrics. Accordingly, if any component in a storage fabric fails and causes that storage fabric to fail, the I/O controllers 910 may continue to maintain connections to the SSDs 914 via an alternative storage fabric.

Each I/O controller 910 represents a device configured to connect one or more host computing devices to one or more SSDs (e.g., I/O controller 108A-Y of FIG. 1). An I/O controller 910 includes a processing device 902, and a memory 904 (e.g., read-only memory (ROM), flash memory, dynamic random access memory (DRAM) such as synchronous DRAM (SDRAM) or Rambus DRAM (RDRAM), etc.). The memory 904 may include instructions 954 for a volume manager 980 (e.g., as described above with respect to FIGS. 1 and 2), and/or a software library containing methods that call a volume manager 980. The processing device 902 may execute the instructions 954 for the volume manager 980 from memory 904. The I/O controller 910 may further include one or more network interface devices 922 to connect to a network. In one embodiment, each I/O controller 910 is a system on a chip (SoC) including processing device 902, memory 904, and one or more network interface devices 922.

Management controller 916 represents a device configured to manage a storage fabric. Management controller 916 may include a memory 932 having instructions 956 and a processing device 930 that loads and executes those instructions 956. The instructions 956 may also include a volume manager, and/or a software library containing methods that call a volume manager. Memory 932 may be read-only memory (ROM), flash memory, dynamic random access memory (DRAM) such as synchronous DRAM (SDRAM) or Rambus DRAM (RDRAM), etc. In one embodiment, management controller 916 is a system on a chip (SoC) including processing device 930 and memory 932.

Processing device 902 and/or processing device 930 represents one or more general-purpose processors such as a microprocessor, central processing unit, or the like. More particularly, the processing device 902, 930 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 902, 930 may also be one or more special-purpose processing devices such as an application specific integrated circuit (ASIC), a field programmable gate array (FPGA), a digital signal processor (DSP), network processor, or the like. Processing device 902, 930 is configured to execute processing logic (e.g., instructions 954, 956) for performing operations discussed herein.

The memory 904, 932 may be a machine-readable storage medium (or more specifically a computer-readable storage medium) on which is stored one or more sets of instructions 954, 956 embodying any one or more of the methodologies or functions described herein. The instructions 954, 956 may also reside, completely or at least partially, within the processing device 902, 930 during execution thereof by the I/O controller 910 and/or management controller 916, the processing device 902, 930 also constituting computer-readable storage media. Alternatively, or additionally, the instructions 954, 956 may be resident on a solid state storage drive (e.g., a solid state storage drive 914), an optical drive, optical media, and/or a hard disk drive connected to bus 908.

While the computer-readable storage medium is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any non-transitory medium that is capable of storing or encoding a set of instructions for execution by the machine and that cause the machine to perform any one or more of the methodologies described herein. The term "computer-readable storage medium" shall accordingly be taken to include, but not be limited to, solid-state memories, and optical and magnetic media.

The storage array 912 represents a device that contains a group of storage devices 914, which may be solid state drives (SSDs) and/or disk drives. Storage array 912 may arrange storage devices 914 into a redundant array of independent disks (RAID). The storage array 912 may distribute data across the storage devices 914 in one of several RAID levels to provide different levels of redundancy and performance. Storage devices 914 may be SAS/SATA drives, non-volatile memory express (NVMe) drives, small computer system interface (SCSI) over PCIe (SOP) drives, or storage devices that communicate using different protocols. The number of storage devices 914 included in storage array 912 may be less than 10 to more than 100. The storage devices 914 may have the same or different storage capacities.

The modules, components and other features described herein (for example in relation to FIG. 2) can be implemented as discrete hardware components or integrated in the functionality of hardware components such as ASICS, FPGAs, DSPs, SoCs or similar devices. In addition, the modules can be implemented as firmware or functional circuitry within hardware devices. Further, the modules can be implemented in any combination of hardware devices and software components, or only in software.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving", "determining", "generating", "incrementing", or the like, refer to the actions and processes of a processing device or processing logic that manipulates and transforms data represented as physical (e.g., electronic) quantities within registers and memories into other data similarly represented as physical quantities within the memories or registers or other such information storage devices.

Embodiments of the invention also relate to an apparatus for performing the operations herein. This apparatus may be specially constructed for the required purposes, or it may comprise a general purpose computer selectively activated or reconfigured by a computer program or firmware stored in the computer. Such a computer program or firmware may be stored in a computer readable storage medium, such as, but not limited to, any type of disk including optical disks, CD-ROMs, and magnetic-optical disks, read-only memories (ROMs), random access memories (RAMs), electrically programmable read only memories (EPROMs), electrically erasable programmable read only memories (EEPROMs), magnetic or optical cards, or any type of media suitable for storing electronic instructions. The term "computer-readable storage medium" shall also be taken to include any medium other than a carrier wave that is capable of storing or encoding a set of instructions for execution by the computing device that cause the computing device to perform any one or more of the methodologies of the present invention.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
generating, by a processing device, a clone of a first volume of storage, the first volume comprising a plurality of storage blocks, wherein the clone is a second volume that is writable and that references the plurality of storage blocks;
incrementing, by the processing device, a global volume count that represents a number of volumes, wherein:
the global volume count comprises a first bit sequence,
the first bit sequence comprises a marker bit,
the marker bit indicates the global volume count, and
each bit, other than the marker bit, in the first bit sequence is associated with a different volume and indicates whether the volume associated with the bit exists; and
for each storage block of the plurality of storage blocks, postponing, by the processing device, an update to metadata of the storage block until an event that causes any volume to stop referencing the storage block, wherein the metadata indicates volumes that reference the storage.

2. The method of claim 1, further comprising:
receiving a command to overwrite a first storage block of the plurality of storage blocks for a particular volume that references the first storage block; and
after receiving the command to overwrite the first storage block, performing the following comprising:
invalidating the first storage block for the particular volume; updating the metadata of the first storage block to indicate that the second volume references the first storage block; and
subsequently updating the metadata of the first storage block to indicate that the particular volume no longer references the first storage block.

3. The method of claim 1, further comprising:
receiving a command to delete a particular volume; and
after receiving the command to delete the particular volume, performing the following for each storage block of the plurality of storage blocks that have not already been invalidated for the particular volume:
updating the metadata of the storage block to indicate that the second volume references the storage block; and
subsequently updating the metadata of the storage block to indicate that the particular volume no longer references the storage block.

4. The method of claim 1, wherein the marker bit is at a bit position that is one greater than the global volume count.

5. The method of claim 1, further comprising:
receiving a command to write new data to the second volume;
allocating a new storage block to the second volume, wherein the first volume does not reference the new storage block; and
updating metadata of the new storage block to indicate that the first volume does not reference the new storage block and that the second volume does reference the new storage block, wherein the metadata comprises a bit sequence, and wherein a first bit in the bit sequence is associated with the first volume and a second bit in the bit sequence is associated with the second volume.

6. The method of claim 1, further comprising:
receiving a command to delete a particular volume;
updating the first bit sequence by changing a particular bit associated with the particular volume; and
generating a second bit sequence that does not reference the particular volume, wherein states of all bits that follow the particular bit in the first bit sequence are shifted one position in the second bit sequence.

7. The method of claim 6, further comprising:
after updating the first bit sequence and generating the second bit sequence, performing the following for each storage block of the plurality of storage blocks that have not already been invalidated for the particular volume;
comparing a third bit sequence of the metadata for the storage block to the first bit sequence to determine how to update the bit sequence;
updating the third bit sequence based on the first bit sequence; and
subsequently updating the third bit sequence based on the second bit sequence.

8. A storage server comprising:
a plurality of storage devices that together comprise a plurality of storage blocks; and a processing device operatively coupled to the plurality of storage devices, the processing device to:
generate a clone of a first volume of storage, the first volume comprising a subset of the plurality of storage blocks, wherein the clone is a second volume that is writable and that references the subset of the plurality of storage blocks;
increment a global volume count that represents a number of volumes, wherein:
the global volume count comprises a first bit sequence,
the first bit sequence comprises a marker bit,
the marker bit indicates the global volume count, and
each bit, other than the marker bit, in the first bit sequence is associated with a different volume and indicates whether the volume associated with the bit exists; and
for each storage block in the subset of the plurality of storage blocks, postponing an update to metadata of the storage block until an event that causes any volume to stop referencing the storage block, wherein the metadata indicates volumes that reference the storage block.

9. The storage server of claim 8, wherein the processing device is further to:
receive a command to overwrite a first storage block of the subset for a particular volume that references the first storage block; and
after receiving the command to overwrite the first storage block, perform the following comprising:
invalidate the first storage block for the particular volume;
update the metadata of the first storage block to indicate that the second volume references the first storage block; and
subsequently update the metadata of the first storage block to indicate that the particular volume no longer references the first storage block.

10. The storage server of claim 8, wherein the processing device is further to:
receive a command to write new data to the second volume;
allocate a new storage block to the second volume, wherein the first volume does not reference the new storage block; and
update metadata of the new storage block to indicate that the first volume does not reference the new storage block and that the second volume does reference the new storage block, wherein the metadata comprises a bit sequence, and wherein a first bit in the bit sequence is associated with the first volume and a second bit in the bit sequence is associated with the second volume.

11. The storage server of claim 8, wherein the processing device is further to:
receive a command to delete a particular volume; and
after receiving the command to delete the particular volume, perform the following for each storage block in the subset of the plurality of storage blocks that have not already been invalidated for the particular volume:
update the metadata of the storage block to indicate that the second volume references the storage block; and
subsequently update the metadata of the storage block to indicate that the particular volume no longer references the storage block.

12. The storage server of claim 11, wherein the processing device is further to:
receive a command to delete a particular volume;
update the first bit sequence by changing a particular bit associated with the particular volume; and
generate a second bit sequence that does not reference the particular volume, wherein states of all bits that follow the particular bit in the first bit sequence are shifted one position in the second bit sequence.

13. The storage server of claim 12, wherein the processing device is further to:
after updating the first bit sequence and generating the second bit sequence, perform the following for each storage block of the plurality of storage blocks that have not already been invalidated for the particular volume:
compare a third bit sequence of the metadata for the storage block to the first bit sequence to determine how to update the bit sequence;
update the third bit sequence based on the first bit sequence; and
subsequently update the third bit sequence based on the second bit sequence.

14. A method comprising:
generating, by a processing device, a clone of a first volume of storage, the first volume comprising a plurality of storage blocks, wherein the clone is a second volume that is writable and that references the plurality of storage blocks;
incrementing, by the processing device, a global volume count that represents a number of volumes, wherein:
the global volume count comprises a first bit sequence, and
each bit in the first bit sequence is associated with a different volume and indicates whether the volume associated with the bit exists;
for each storage block of the plurality of storage blocks, postponing, by the processing device, an update to metadata of the storage block until an event that causes any volume to stop referencing the storage block, wherein the metadata indicates volumes that reference the storage;
receiving a command to delete a particular volume;
updating the first bit sequence by changing a particular bit associated with the particular volume; and
generating a second bit sequence that does not reference the particular volume, wherein states of all bits that follow the particular bit in the first bit sequence are shifted one position in the second bit sequence.

15. The method of claim 14, further comprising:
receiving a command to overwrite a first storage block of the plurality of storage blocks for a particular volume that references the first storage block; and
after receiving the command to overwrite the first storage block, performing the following comprising:

invalidating the first storage block for the particular volume; updating the metadata of the first storage block to indicate that the second volume references the first storage block; and subsequently updating the metadata of the first storage block to indicate that the particular volume no longer references the first storage block.

16. The method of claim 14, further comprising:

receiving a command to delete a particular volume; and after receiving the command to delete the particular volume, performing the following for each storage block of the plurality of storage blocks that have not already been invalidated for the particular volume:

updating the metadata of the storage block to indicate that the second volume references the storage block; and subsequently updating the metadata of the storage block to indicate that the particular volume no longer references the storage block.

17. The method of claim 14, further comprising:

after updating the first bit sequence and generating the second bit sequence, performing the following for each storage block of the plurality of storage blocks that have not already been invalidated for the particular volume:

comparing a third bit sequence of the metadata for the storage block to the first bit sequence to determine how to update the bit sequence;

updating the third bit sequence based on the first bit sequence; and subsequently updating the third bit sequence based on the second bit sequence.

18. The method of claim 14, wherein the first bit sequence comprises a marker bit at a bit position that is one greater than the global volume count, wherein the bit position of the marker bit indicates the global volume count.

19. The method of claim 14, further comprising:

receiving a command to write new data to the second volume; allocating a new storage block to the second volume, wherein the first volume does not reference the new storage block; and updating metadata of the new storage block to indicate that the first volume does not reference the new storage block and that the second volume does reference the new storage block, wherein the metadata comprises a bit sequence, and wherein a first bit in the bit sequence is associated with the first volume and a second bit in the bit sequence is associated with the second volume.

* * * * *